(12) United States Patent
Sennewald et al.

(10) Patent No.: US 9,842,044 B2
(45) Date of Patent: Dec. 12, 2017

(54) COMMIT SENSITIVE TESTS

(71) Applicant: International Business Machines Corporation, Armonk, NY (US)

(72) Inventors: Ray Sennewald, San Jose, CA (US); Lila Tretikov, Los Gatos, CA (US); Ran Zhou, Campbell, CA (US)

(73) Assignee: SUGARCRM INC., Cupertino, CA (US)

( * ) Notice: Subject to any disclaimer, the term of this patent is extended or adjusted under 35 U.S.C. 154(b) by 140 days.

(21) Appl. No.: 13/766,763

(22) Filed: Feb. 13, 2013

(65) Prior Publication Data

US 2014/0229923 A1 Aug. 14, 2014

(51) Int. Cl.
G06F 9/44 (2006.01)
G06F 11/36 (2006.01)

(52) U.S. Cl.
CPC ...... *G06F 11/3692* (2013.01); *G06F 11/3688* (2013.01)

(58) Field of Classification Search
CPC .......................... G06F 11/3692; G06F 11/3688
USPC ................................ 717/124, 126, 127, 131
See application file for complete search history.

(56) References Cited

U.S. PATENT DOCUMENTS

| | | | | |
|---|---|---|---|---|
| 6,594,820 B1 * | 7/2003 | Ungar | ................ | G06F 11/3688 714/38.13 |
| 7,568,183 B1 * | 7/2009 | Hardy | ................ | G06F 11/3684 717/121 |
| 7,614,042 B1 * | 11/2009 | Hardy | ................ | G06F 11/368 717/124 |
| 8,276,123 B1 * | 9/2012 | Deng | .................. | G06F 11/368 714/37 |
| 8,555,253 B2 * | 10/2013 | Shufer | ............... | G06F 11/3668 709/203 |
| 2007/0101196 A1 * | 5/2007 | Rogers | ............... | G06F 11/3664 714/38.14 |
| 2010/0192220 A1 * | 7/2010 | Heizmann | .......... | G06F 11/3664 726/19 |
| 2011/0004867 A1 * | 1/2011 | Holden | .............. | G06F 11/3676 717/127 |

(Continued)

OTHER PUBLICATIONS

Srivastava, et al., "Effectively Prioritizing Tests in Development Environment", Published by ACM, ISSTA '02 Proceedings of the 2002 ACM SIGSOFT International symposium on Software testing and analysis pp. 97-106.*

(Continued)

*Primary Examiner* — Hossain Morshed
(74) *Attorney, Agent, or Firm* — Steven M. Greenberg, Esq.; CRGO Law

(57) ABSTRACT

A method, system and computer program product for commit sensitive testing is provided. The method includes applying a full set of different tests to an application and monitoring the application of the full set of different tests to determine files of the application affected by the full set of the different tests. The method also includes generating a mapping of each of the files and corresponding ones of the full set of the different tests affecting each of the files. Finally, the method includes responding to a change in one of the files by identifying in the mapping only a subset of the full set of the different tests affecting the changed one of the files and applying only the subset of the full set of the different tests to the changed one of the files.

12 Claims, 1 Drawing Sheet

(56) References Cited

U.S. PATENT DOCUMENTS

| | | | |
|---|---|---|---|
| 2011/0107153 A1 | 5/2011 | Shufer et al. | |
| 2011/0219359 A1* | 9/2011 | Gupta | G06F 9/44 717/124 |
| 2012/0030515 A1* | 2/2012 | Birakoglu | G06F 11/368 714/38.1 |
| 2013/0139126 A1* | 5/2013 | Archer | G06F 9/44505 717/121 |
| 2014/0013092 A1* | 1/2014 | Fillipi | G06F 9/44 713/1 |

OTHER PUBLICATIONS

IBM, "Utilizing Version Control Systems to Test Multiple File Change Scenarios within a Web Application Deployment", Publsihed by Ip.Com, IPCOM000191685, Jan. 11, 2010.*

Microsoft Research—Magellan (2004) Located at: http://research.microsoft.com/en-us/news/features/magellan.aspx.*

Sheahan, "Passing the Test: Magellan Improves Your code", Microsoft Research, 2004.*

IBM, "Utilizing Version Control Systems to Test Multiple File Change Scenarios within a Web Application Deployment", IP.com, 2010.*

Srivastava, "Effectively Prioritizing Tests in Development Environment", ACM SIGSOFT, 2002.*

Srivastava, "Effectively Prioritizing Tests in Development Environment", 2002, 2002 ACM; ISSTA '02 Proceedings of the 2002 ACM SIGSOFT.*

* cited by examiner

COMMIT SENSITIVE TESTS

BACKGROUND OF THE INVENTION

Field of the Invention

The present invention relates to the field of functional and operational testing of a computer program and more particularly to incremental unit testing.

Description of the Related Art

Software functional testing relates to the functional testing of a graphical user interface (GUI) coupled to an underlying software application. Conventional functional testing tools allow the end user to create, modify and run functional, distributed functional, regression and smoke tests for applications built using any of a wide variety of integrated development environments. In this regard, the conventional functional testing tool can generate a test script for a GUI in which elements of the GUI can be exercised both sequentially and conditionally. Through a thorough testing of the GUI of an application, the functional testing tool can automatically identify defects early, often and repeatably.

Operational testing, in comparison to functional testing, refers to the exercise of the logical performance of an application under test. In operational testing, the invocation of an object can be used to compare an expected outcome with an actual outcome from the invocation. Both operational and functional testing can be automated through the use of testing scripts or tests. Tests can be produced manually and provided as input to a testing engine, or the tests can be generated in an automated fashion. In the latter instance, a conventional testing tool can monitor and record the interaction between end user and GUI during a recording phase of testing. During the recording phase, a test can be produced based upon the identity of GUI elements addressed by the end user, the corresponding logical operations invoked by the addressing of the GUI elements, the results of the invocation, and the sequence in which the GUI elements are addressed.

When testing a complex application of many different functional components disposed within different files, applying a full set of all tests related to the application can be a long, tedious, and resource-intensive process. Yet, during the development and maintenance process as part of the software lifecycle, applying a full set of tests is not necessary when only a small number of the files are affected by any particular change. Yet, knowing a priori the identity of the files impacted by a change to the application requires intimate knowledge and memory of the structure of the application and presupposes that even with the knowledge, one might be aware of all possible affects of a change. Of course, this is not usually the case. Accordingly, even in the face of a minor change to a single file supporting an application, the full compliment of tests for the application must be applied.

BRIEF SUMMARY OF THE INVENTION

Embodiments of the present invention address deficiencies of the art in respect to application testing and provide a novel and non-obvious method, system and computer program product for commit sensitive testing. In an embodiment of the invention, a method for commit sensitive testing is provided. The method includes applying a full set of different tests to an application and monitoring the application of the full set of different tests to determine files of the application affected by the full set of the different tests. The method also includes generating a mapping of each of the files and corresponding ones of the full set of the different tests affecting each of the files. Finally, the method includes responding to a change in one of the files by identifying in the mapping only a subset of the full set of the different tests affecting the changed one of the files and applying only the subset of the full set of the different tests to the changed one of the files. Optionally, the method additionally includes comparing a result of the application of the subset of the full set of the different tests to a result of the application of the full set of the different tests and reporting differences from the comparison as new errors produced by the changed one of the files.

In another embodiment of the invention, an application testing system can be configured for commit sensitive testing. The system can include a host computing system that includes one or more computers each with memory and at least one processor. The system also includes a testing tool executing in the memory of the host computing system and configured to apply different tests to different files of an application. Finally, the system includes a commit sensitive testing module coupled to the testing tool. The module includes program code enabled upon execution in the memory to apply a full set of different tests to an application, to monitor the application of the full set of different tests to determine files of the application affected by the full set of the different tests, to generate a mapping of each of the files and corresponding ones of the full set of the different tests affecting each of the files, and to respond to a change in one of the files, by identifying in the mapping only a subset of the full set of the different tests affecting the changed one of the files and applying only the subset of the full set of the different tests to the changed one of the files.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for commit sensitive testing. In accordance with an embodiment of the invention, different tests can be loaded from a data store of tests and applied to an application composed of multiple different files. For each test applied, a listing of those of the files impacted by the tests can be recorded. A resulting reverse mapping can be produced based upon a list of files and corresponding tests associated with each of the files. Thereafter, when one or more of the files changes, the tests corresponding to the changed file can be identified from the reverse mapping and applied to the changed files.

Figure 1:
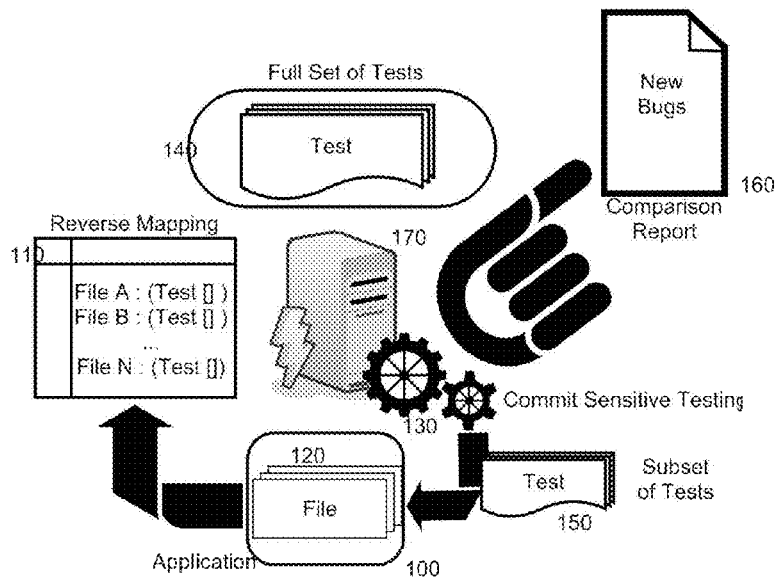
FIG. 1 is a pictorial illustration of a process for commit sensitive testing.

In further illustration, FIG. 1 pictorially shows a process for commit sensitive testing. As shown in FIG. 1, commit sensitive testing logic 130 can monitor the application of a full set of tests 140 to an application 100 by a test server 170. The commit sensitive testing logic 130 during monitoring can identify different files 120 of the application 100 impacted by each test of the full set of tests 140. Consequently, a reverse mapping 110 can be produced mapping each of the files 100 to an impacting set of tests from the full set of tests 140. Thereafter, as a modification is performed to one or more of the files 120 of the application 100, the commit sensitive testing logic 130 can consult the reverse mapping 110 to identify those of the full set of tests 140 known to impact the changed ones of the files 120 in order to assemble a subset of the tests 150. Finally, only the subset of the tests 150 need be applied by the test server 170 to the application 100. Optionally, a comparison report 160 can be generated comparing a set of test results from the full set of tests 140 to the results from the subset of test 150 in order to identify only those results produced by the modification to the files 120 of the application 100.

Figure 2:
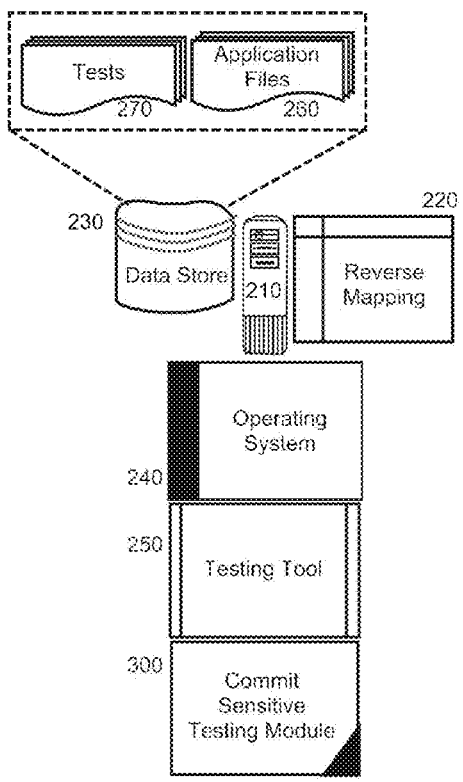
FIG. 2 is a schematic illustration of a testing system configured for commit sensitive testing; and, FIG. 3 is a flow chart illustrating a process for commit sensitive testing.

The process described in connection with FIG. 1 can be implemented within a testing system. In yet further illustration, FIG. 2 schematically shows a testing system configured for commit sensitive testing. The system can include a host computing system 210 that includes one or more computers each with memory and at least one processor (only a single computer shown for the purpose of illustrative simplicity). The host computing system 210 can include an operating system 240 upon which a testing tool 250 can execute. The testing tool 250 can be configured to apply one or more tests 270 in data store 230 to the files 260 of an application.

Of note, a commit sensitive testing module 300 can be coupled to the testing tool 250. The commit sensitive testing module 300 can include program code that when executes in the memory of the host computing system 210 is enabled to monitor which of the files 260 are impacted by individual ones of the tests 270 when the tests 270 are applied to the files 260 by the testing tool 250. For example, when one of the files 260 is opened during the application of one of the tests 270, the one of the files 260 can be considered impacted. Alternatively, when one of the files 260 is both opened and read from during the application of one of the tests 270, the one of the files 260 can be considered impacted.

The program code of the commit sensitive testing module 300 additionally can be enabled when executed in the memory of the host computing system 210 to generate a reverse mapping 220 for the application of the tests 270 to the files 260. The reverse mapping 220 can indicate a mapping of each of the files 260 and a corresponding set of zero or more of the tests 270 impacted by the tests 270. Finally, in response to a modification of one or more of the files 260, the program code of the commit sensitive testing module 300 can be enabled when executed in the memory of the host computing system 210 to direct the testing tool 250 to apply only those of the tests 270 implicated by the reverse mapping 220 in respect to the modified one or more of the files 260.

Figure 3:
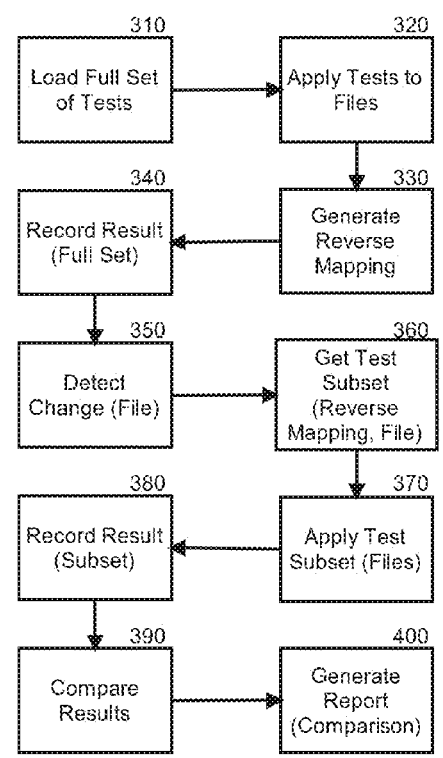

In even yet further illustration of the operation of the commit sensitive testing module 300, FIG. 3 is a flow chart illustrating a process for commit sensitive testing. Beginning in block 310, a full set of tests can be loaded for application against the files forming a software application. In block 320, the full set of tests can be applied to the files and in block 330, a reverse mapping can be generated for the files of the software application and the tests impacting each of the files. In block 340, a result set can be produced from the application of the tests including any indication of errors produced in consequence of the application of the tests.

In block 350, a change can be detected to one of the files of the software application. In response to the detected change, in block 360 a subset of the tests can identified from the reverse mapping as having been associated with the one of the files that has been changed. Thereafter, in block 370 the subset of the tests can be applied to the files of the software application and in block 380 a result of the application of the subset of tests can be recorded. In block 390, the results from the application of the subset of tests can be compared to that of the full set of tests and in block 400, a comparison report can be generated. In this way, not all tests of the full set of tests need be applied to the software application in response to a change in only a selection of the files of the software application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for commit sensitive testing comprising:
   applying a full set of different tests to an application;
   monitoring the application of the full set of different tests to determine, for each test applied, a listing of files of the application affected by the full set of the different tests;
   generating a reverse mapping of each of the files and corresponding ones of the full set of the different tests affecting each of the files, the reverse mapping comprising a table with a multiplicity of entries, each of the entries listing an of individual one of the files of the application and a corresponding array data structure of different ones of the different tests in the full set that are determined to impact the associated one of the Individual files based upon the Individual files having been opened during an application of an associated one of the tests in the array;
   recording a result of the application of the full set of the different tests to the application indicating errors produced in consequence of the application of the full set of the tests; and,
   responsive to detecting a modification to one of the files, (1) identifying in the reverse mapping based upon the one of the flies for which the modification is detected, only a subset of the full set of the different tests affecting the modified one of the files, (2) applying only the subset of the full set of the different tests to the modified one of the files, (3) recording a result of the application of the subset of the full set of the different tests indicating errors produced in consequence of the application of the subset of the full set of the different tests, (4) comparing the recorded result of the application of the subset of the full set of the different tests to the recorded result of the application of the full set of the different tests, (5) identifying only those of the recorded results of the application of the subset of the full set of the different tests based upon the comparison which are determined to have been produced by the modification to the one of the files and (6) generating a report of the comparison including the identified recorded results determined to have been produced by the modification to the one of the files.

2. The method of claim 1, wherein the application is a Web application.

3. The method of claim 2, wherein the files are markup language files.

4. The method of claim 1, wherein the mapping is a table of different files and corresponding ones of the tests affecting each of the different files.

5. An application testing system configured for commit sensitive testing, the system comprising:

a host computing system comprising at least one computer with memory and at least one processor;

a testing tool executing in the memory of the host computing system and configured to apply a plurality of tests to different files of an application; and, a commit sensitive testing module coupled to the testing tool, the module comprising program code enabled upon execution in the memory to apply a full set of different tests to an application, to monitor the application of the full set of different tests to determine, for each test applied, a listing of files of the application affected by the full set of the different tests, to generate a reverse mapping of each of the files and corresponding ones of the full set of the different tests affecting each of the files, the reverse mapping comprising a table with a multiplicity of entries, each of the entries listing an of Individual one of the files of the application and a corresponding array data structure of different ones of the different tests in the full set that are determined to impact the associated one of the Individual files based upon the individual files having been opened during an application of an associated one of the tests in the array, to record a result of the application of the full set of the different tests to the application Indicating errors produced in consequence of the application of the full set of the tests, and to respond to a modification to one of the files, by (1) Identifying in the reverse mapping based upon the one of the files for which the modification is detected, only a subset of the full set of the different tests affecting the modified one of the files, (2) applying only the subset of the full set of the different tests to the modified one of the files, (3) recording a result of the application of the subset of the full set of the different tests indicating errors produced in consequence of the application of the subset of the full set of the different tests, (4) comparing the recorded result of the application of the subset of the full set of the different tests to the recorded result of the application of the full set of the different tests;

(5) identifying only those of the recorded results of the application of the subset of the full set of the different tests based upon the comparison which are determined to have been produced by the modification to the one of the files and (6) generating a report of the comparison including the identified recorded results determined to have been produced by the modification to the one of the files.

6. The system of claim 5, wherein the application is a Web application.

7. The system of claim 6, wherein the files are markup language files.

8. The system of claim 5, wherein the mapping is a table of different files and corresponding ones of the tests affecting each of the different files.

9. A computer program product for commit sensitive testing, the computer program product comprising:

a computer readable storage medium comprising a memory device having computer readable program code embodied therewith, the computer readable program code comprising:

computer readable program code for applying a full set of different tests to an application;

computer readable program code for monitoring the application of the full set of different tests to determine, for each test applied, a listing of files of the application affected by the full set of the different tests;

computer readable program code for generating a reverse mapping of each of the files and corresponding ones of the full set of the different tests affecting each of the files, the reverse mapping comprising a table with a multiplicity of entries, each of the entries listing an individual one of the files of the application and a corresponding array data structure of different ones of the different tests in the full set that are determined to impact the associated one of the Individual files based upon the individual files having been opened during an application of an associated one of the tests in the array;

computer readable program code for recording a result of the application of the full set of the different tests to the application indicating errors produced in consequence of the application of the full set of the tests; and, computer readable program code for, in response to detecting a modification to one of the files, (1) identifying in the reverse mapping based upon the one of the files for which the modification is detected, only a subset of the full set of the different tests affecting the modified one of the files, (2) applying only the subset of the full set of the different tests to the modified one of the files, (3) recording a result of the application of the subset of the full set of the different tests indicating errors produced in consequence of the application of the subset of the full set of the different tests, (4) comparing the recorded result of the application of the subset of the full set of the different tests to the recorded result of the application of the full set of the different tests, (5) identifying only those of the recorded results of the application of the subset of the full set of the different tests based upon the comparison which are determined to have been produced by the modification to the one of the files and (6) generating a report of the comparison including the identified recorded results determined to have been produced by the modification to the one of the files.

10. The computer program product of claim 9, wherein the application is a Web application.

11. The computer program product of claim 10, wherein the files are markup language files.

12. The computer program product of claim 9, wherein the mapping is a table of different files and corresponding ones of the tests affecting each of the different files.

* * * * *

UNITED STATES PATENT AND TRADEMARK OFFICE
CERTIFICATE OF CORRECTION

PATENT NO. : 9,842,044 B2
APPLICATION NO. : 13/766763
DATED : December 12, 2017
INVENTOR(S) : Ray Sennewald, Lila Tretikov and Ran Zhou Page 1 of 1

It is certified that error appears in the above-identified patent and that said Letters Patent is hereby corrected as shown below:

On the Title Page

Item (71) reflects the Applicant to be International Business Machines Corporation of Armonk, NY.
The correct Applicant is SugarCRM Inc. of Cupertino, CA.

Signed and Sealed this
Thirteenth Day of November, 2018

Andrei Iancu
*Director of the United States Patent and Trademark Office*